Figure 1:
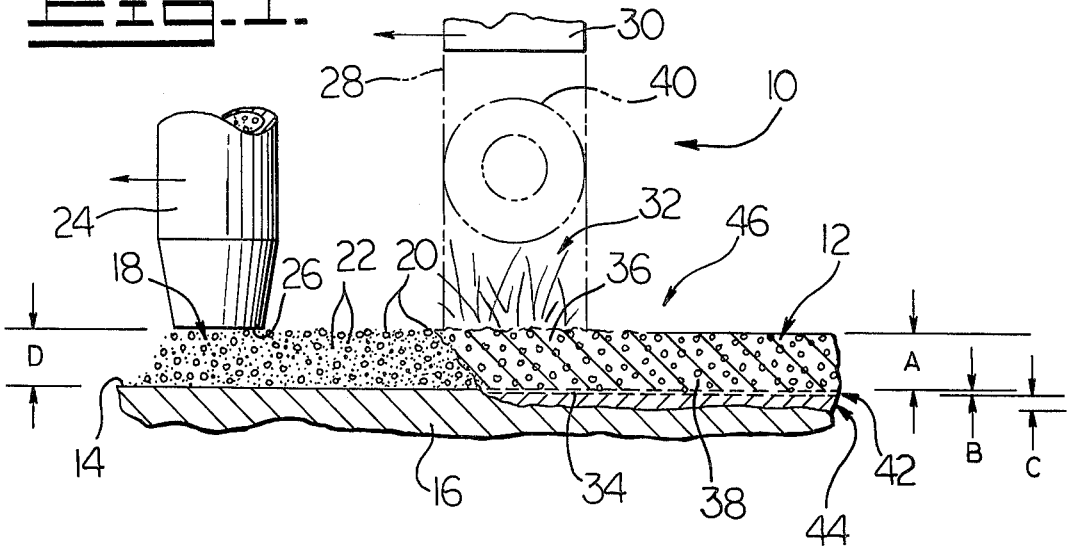
Figure 2:
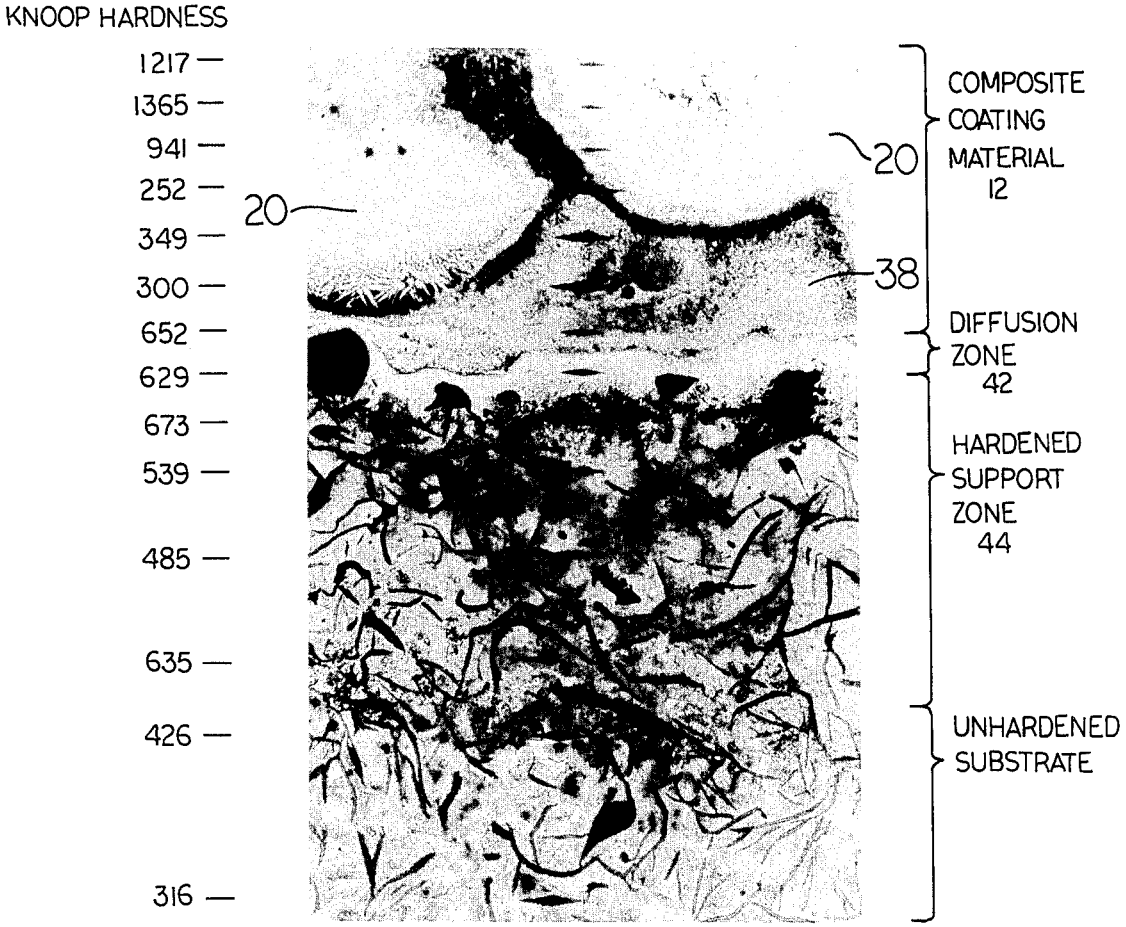

United States Defensive Publication [19] (H) [11] T967,009

Gale [43] Feb. 7, 1978

[54] METHOD OF APPLYING A WEAR-RESISTANT COMPOSITE COATING TO AN ARTICLE

[75] Inventor: Preston L. Gale, East Peoria, Ill.

[73] Assignee: Caterpillar Tractor Co., Peoria, Ill.

[21] Appl. No.: 785,631

[22] Filed: Apr. 7, 1977

Related U.S. Application Data

[63] Continuation of Ser. No. 643,546, Dec. 22, 1975, abandoned.

[51] Int. Cl.[2] ..... C21D 1/34

[52] U.S. Cl. ..... 427/53

[57] ABSTRACT

A method of applying a wear-resistant composite coating to an article is disclosed which includes the steps of depositing a plurality of wear-resistant particles having a predetermined melting point along with a lower melting point element in solid form onto the surface of the article, focusably directing a coherent beam of electromagnetic energy thereon at a power density level sufficient to melt the element and a limited surface portion of the article while retaining the particles in substantially solid form, and removing the beam therefrom to allow solidification of the melted portion thereof into a matrix in which the wear-resistant particles are embedded. Advantageously this method provides a thin diffusion zone and a hardened zone underneath it to better support the coating.

5 Claims, 1 Sheet Drawing,

17 Pages Specification

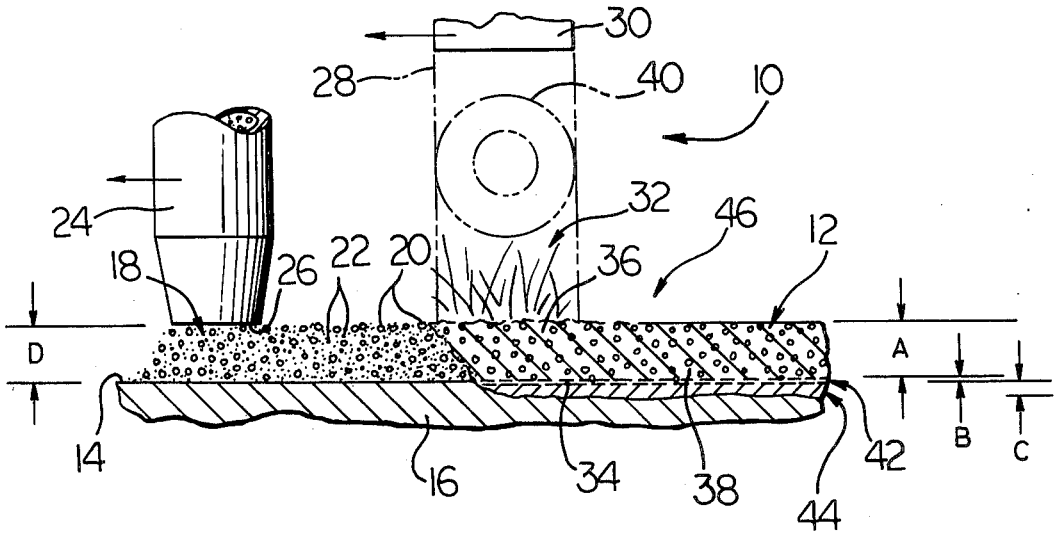

The file of this unexamined application may be inspected and copies thereof may be purchased (849 O.G. 1221, Apr. 9, 1968).